United States Patent [19]
Wolfe et al.

[11] Patent Number: 6,036,437
[45] Date of Patent: Mar. 14, 2000

[54] BUCKET COVER GEOMETRY FOR BRUSH SEAL APPLICATIONS

[75] Inventors: Christopher Edward Wolfe, Niskayuna; Robert Harold Cromer, Johnstown; Martin Francis O'Connor, Schenectady; Norman Arnold Turnquist, Cobleskill; Osman Saim Dinc, Troy, all of N.Y.

[73] Assignee: General Electric Co., Schenectady, N.Y.

[21] Appl. No.: 09/054,742

[22] Filed: Apr. 3, 1998

[51] Int. Cl.⁷ ...................................................... F01D 11/12
[52] U.S. Cl. ................................ 415/173.003; 415/173.5; 415/173.6; 415/174.2; 415/174.5; 415/230; 415/231; 416/189; 416/191
[58] Field of Search ............................ 415/173.3, 173.5, 415/173.6, 174.2, 174.5, 230, 231; 416/189, 191; 277/412, 416, 421

[56] References Cited

U.S. PATENT DOCUMENTS 5,026,252 6/1991 Hoffelner .............................. 415/174.2
5,181,728 1/1993 Stec .......................................... 277/53
5,261,785 11/1993 Williams .

OTHER PUBLICATIONS

"Integrity Testing of Brush Seal in Shroud Ring of T–700 Engine" Hendricks et al.; ASME Conference May, 1993.

Primary Examiner—F. Daniel Lopez
Assistant Examiner—Ninh Nguyen
Attorney, Agent, or Firm—Nixon & Vanderhye

[57] ABSTRACT

Bucket covers for the buckets of a rotating component of a turbomachine are in radial opposition to a stationary component containing a circumferentially extending brush seal having bristles extending into engagement with sealing surfaces of the covers as the covers rotate by the bristles. The leading edges of the covers for the buckets in the plane of rotation and in the plane containing the brush seal have ramps or rounded surfaces which minimize the wear on the bristles and degradation of the performance of the seal as the bucket covers are rotated past the brush seal.

6 Claims, 3 Drawing Sheets

BUCKET COVER GEOMETRY FOR BRUSH SEAL APPLICATIONS

TECHNICAL FIELD

The present invention relates to seals between turbine bucket covers and sealing segments surrounding the bucket stage and particularly relates to novel and unique bucket cover geometry facilitating brush sealing between the covers and segments.

BACKGROUND

Brush seals have been proposed to minimize leakage through the gap between stationary and rotating components, particularly where the leakage is from a higher pressure area to a lower pressure area. For example, in gas or steam turbines, brush seals have been used to minimize the leakage of air or steam, respectively, between the rotary and stationary components and specifically to seal the stationary component with the rotating shaft of the turbine. Such brush seals conventionally have wire or ceramic bristles, often welded or otherwise affixed to a backing plate. The free ends or tips of the bristles lie in contact with the rotational component.

Bucket covers in turbomachinery, for example, steam turbines, are typically integral with the buckets and are machined while on the rotor. This results in excellent radial alignment of the bucket covers until the rotor spins at operating speed or its rated overspeed. At such speeds, buckets in high-pressure sections of the turbine shift, which results in a radial misalignment of the covers, for example, in a range of 0.003 to 0.005 inches. The notch bucket cover on tangential entry dovetail buckets can be misaligned radially by 0.008 inches or more. Deformation during rotation can increase the misalignment of the notch bucket by up to 50%, the rotation not significantly affecting the alignment of the remaining buckets. Corresponding misalignments in an intermediate pressure section of a steam turbine are anticipated to be significantly larger, particularly in later stages.

It has been demonstrated that running surfaces which have steps such as those expected between adjacent covers of integral cover buckets can lead to accelerated wear of the bristle tips as those tips pass the covers. Such wear, for example, during a transient radial excursion of the rotor can lead to excessive clearance and performance degradation. Severe damage to the brush seal can also occur and wear on the bristle tips can be excessive. One effort to address the problem of damaged or worn brush seals has been to provide bristles of differential abrasive qualities. For example, bristles of higher abrasive qualities may initially smooth out the rough surfaces of the shrouded free ends of the buckets, while the less abrasive bristles conform to the shape of the now smooth surfaces to achieve good sealing characteristics. The present invention, however, provides a different approach to the problem of avoiding damage and excessive wear to the brush seals in the environment of a seal between the bucket covers of rotating turbine blades and a surrounding sealing segment or shroud by altering the configuration of the sealing surfaces of the bucket covers.

DISCLOSURE OF THE INVENTION

In accordance with the present invention, the bucket cover geometry is modified such that a leading edge portion of the bucket cover in the direction of rotation of the buckets is radially inset relative to the outer surface of the cover to provide a smooth transition for the bristles from the adjacent leading cover to the following or trailing cover. As the adjacent leading cover in the direction of rotation passes the bristles of the brush seal, the bristles transition from that cover to the following cover by first registering with and in the inset portion. The inset leading edge portion may be profiled to comprise a ramp, a rounded edge or a generally sloped surface but should not include a stepped surface. With that profiled shape of the leading edge portion of the bucket cover, the bristles pass from the adjacent leading cover to the following or trailing cover that may be protruding relative to the adjacent leading cover without significant damage to or wear of the bristle ends.

In a preferred embodiment according to the present invention, there is provided in a turbine having a plurality of rotatable buckets and a stationary shroud surrounding the rotatable buckets, a seal between said buckets and said stationary shroud, comprising a plurality of arcuate covers carried by radially outer ends of the buckets for rotation with the buckets about an axis in a predetermined circumferential direction, the covers having leading and trailing edges in the direction of rotation of the buckets and radially outer circumferentially and axially extending surfaces in radial registration with the stationary shroud and a brush seal comprising a plurality of bristles projecting from the shroud for engagement with the cover surfaces forming the seal therebetween, a leading edge portion of the cover surface of each cover in the direction of rotation of the covers being radially inset relative to the cover surface thereof to afford a smooth transition for the bristles from a leading cover to an immediately adjacent trailing cover as the covers are displaced circumferentially past the bristles.

Accordingly, it is a primary object of the present invention to provide a novel and improved bucket cover geometry for brush seal applications wherein substantial reduction in damage to and wear of brush seal bristles sealing between a shroud or sealing segment and rotating bucket covers is effected.

BEST MODE FOR CARRYING OUT THE INVENTION

Figure 1:
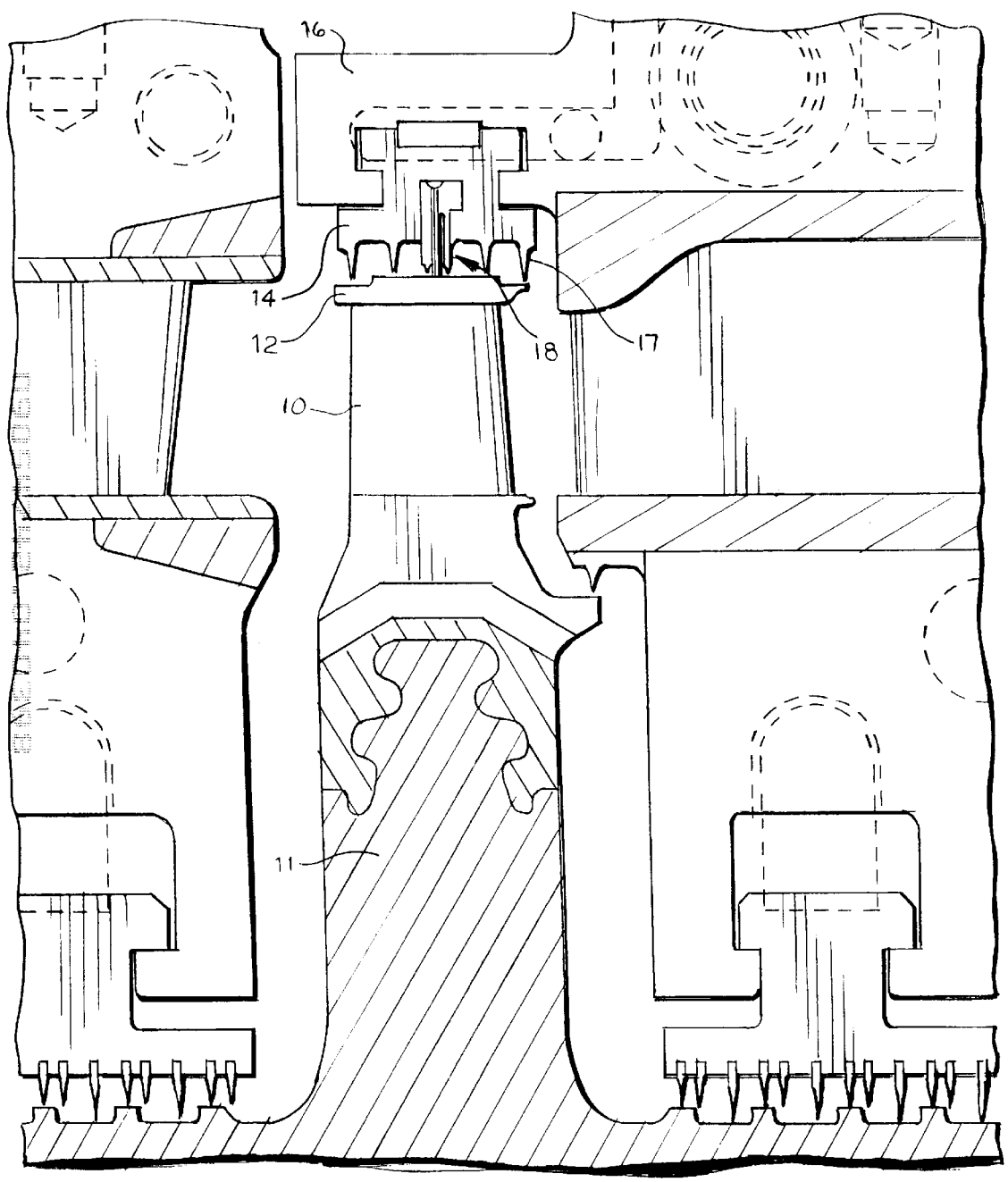
FIG. 1 is a view taken in a radial plane along the axis of a turbine illustrating buckets, bucket covers and bristles forming an improved brush seal according to the present invention.

Referring now to the drawings, particularly to FIG. 1, there is illustrated a plurality of buckets 10 forming part of a rotating component of turbomachinery such as a turbine and secured at their inner ends to turbine wheels 11 rotatable about an axis. The radial outer ends of the buckets 10 are provided with bucket covers 12 which rotate with the buckets 10. A cover 12 may be provided on the outer end of each bucket or on the outer ends of two or more of the buckets whereby adjacent buckets may be coupled to a common cover 12. In the illustrated form (FIG. 2), the buckets 12 are in a generally Z-shaped configuration, viewed in a radial direction, to accommodate the airfoil curvature of the tips of the buckets. In the illustrated form, each bucket has a corresponding cover 12.

Figure 5:
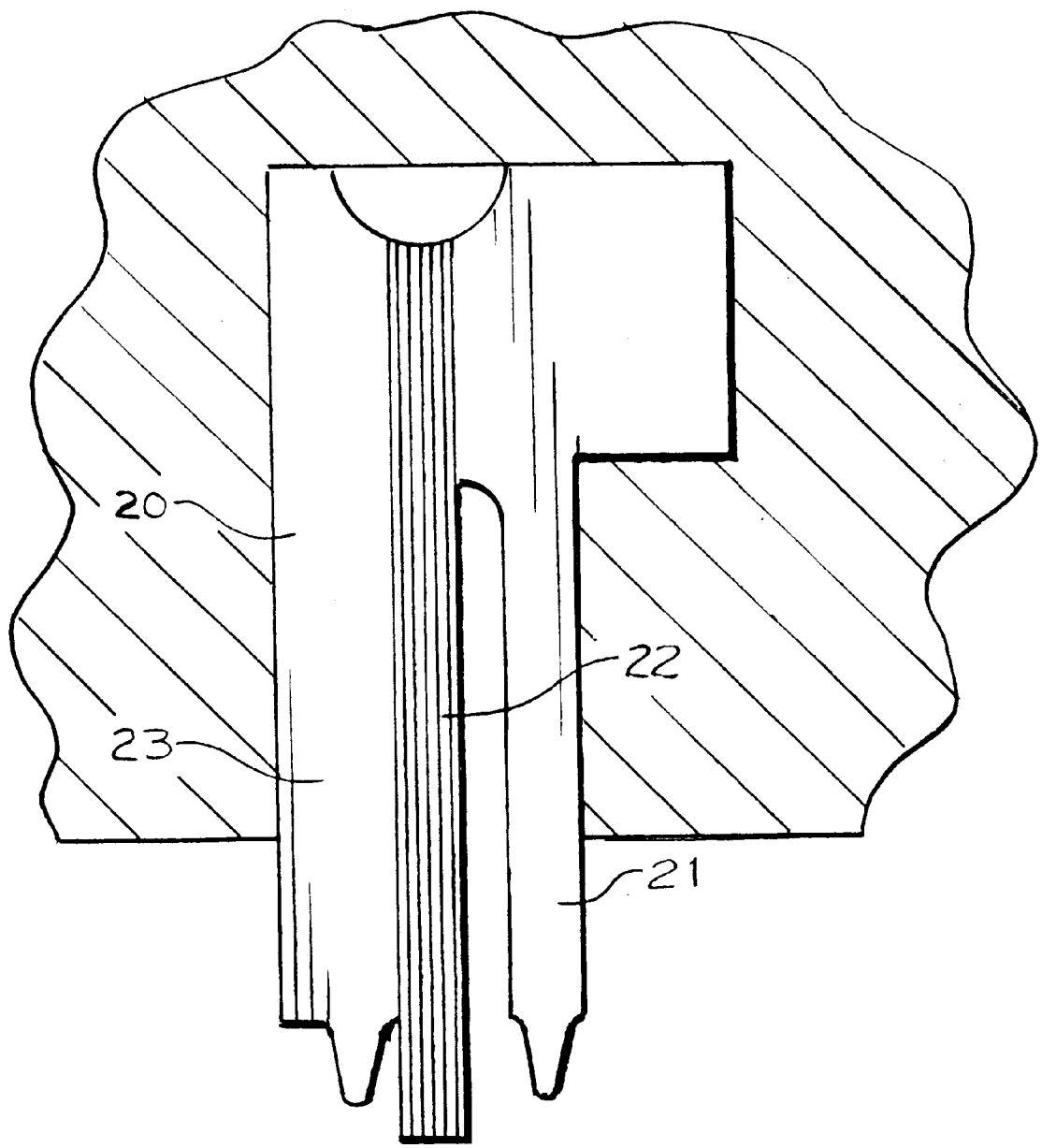
FIG. 5 is a fragmentary cross-sectional view taken normal to the plane of rotation of the buckets on an enlarged scale and illustrating the brush seal on a sealing segment.

In radial opposition to the buckets and in the plane of rotation, there is provided, as illustrated in FIG. 1, a sealing shroud 14 which is fixed to a stationary component 16 of the turbomachinery. Typically, the sealing shroud includes a plurality of circumferentially spaced sealing segments forming an annulus about the bracket covers 12, the shroud or segments including axially spaced labyrinth teeth 17 to effect a seal between the stationary component and the rotational bucket covers. In lieu of the labyrinth seal or in combination with the labyrinth seal as illustrated, there is provided a brush seal, generally designated 1B. The brush seal 18 may comprise a brush seal bracket 20 (FIG. 5) housing a plurality of bristles 22 which project from the bracket 20 for engagement of their tips or distal ends against the outer surfaces of the covers 12. The bracket 20 may comprise a pair of parallel plates 21 and 23 welded together and to the bristles along the outer periphery of the bracket. The bracket may also be segmented circumferentially.

The brush seal bristles 22 may comprise individual bristles forming an array of bristles secured to the bracket 20. Different forms of bristles are embraced by the present invention. For example, the bristles may be woven with the warp or weft woven bristles being inset from the tips of the other warp or weft bristles to project from the bracket into engagement with the bucket covers. Bristles of different abrasive characteristics may also be used. For example, thick and thin bristles may be employed, with the thicker bristles being stiffer and, hence, more abrasive than the thin bristles. Different types of materials may be used to vary the degree of hardness of the bristles. The bristles per se form no part of the present invention and, consequently, it will be appreciated that any of the bristles of any conventional brush seal may be employed in the present invention.

As indicated previously, the bracket 20 housing the bristles may comprise a pair of plates, with the bristles sandwiched between the plates, e.g., leading and backing plates 21 and 23, respectively.

Alternatively, the bracket may comprise a pair of plates having labyrinth teeth formed along free edges thereof and set back from the distal ends of the tips of the bristles. Various forms of brackets and methods for securing the brackets into the sealing shroud or segments may be provided, it being sufficient for purposes of the present invention to note that the bristles provide a circumferential stationary array of bristles surrounding and in bearing contact with the rotating bucket covers 12. The bristles 22 also extend at angles offset from radii of the shroud and are inclined in a direction of rotation of the buckets.

Figure 2:
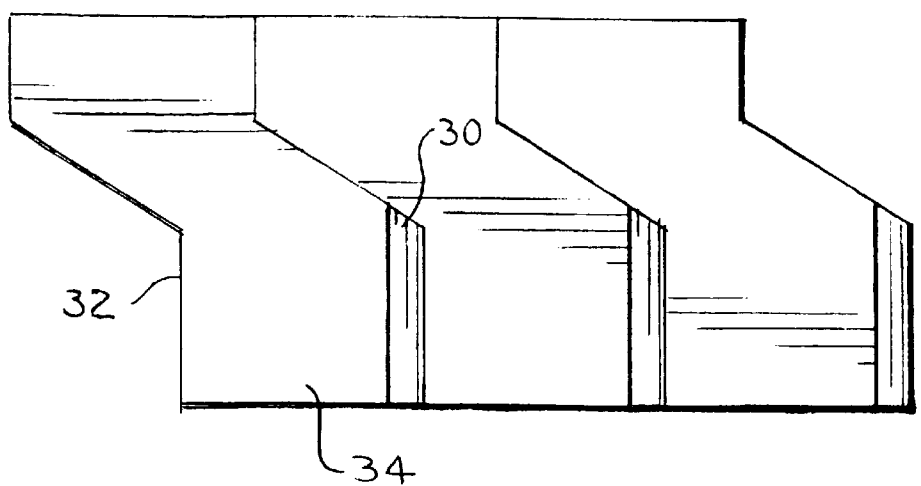
FIG. 2 illustrates a plurality of bucket covers looking in a radially inward direction and in a plane normal to the axis of rotation of the turbine buckets.
Figure 3:
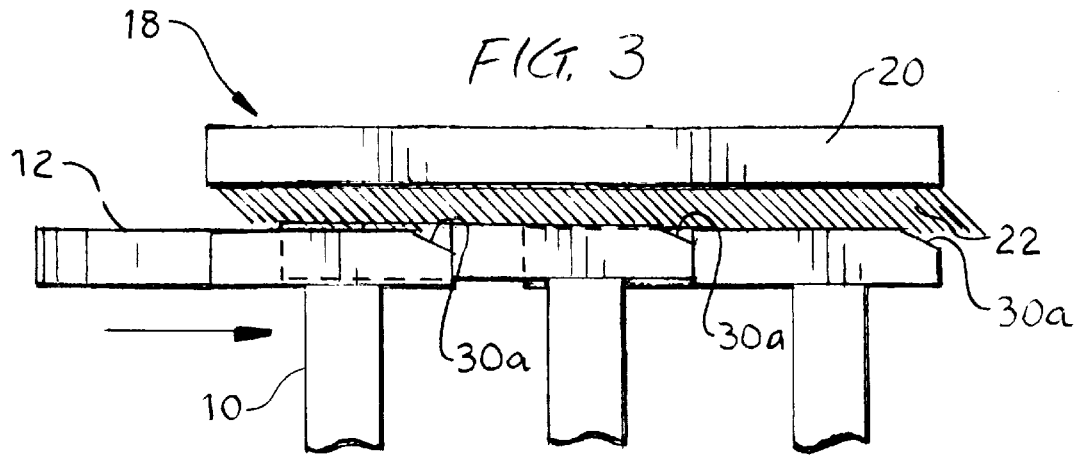
FIG. 3 is a side elevational view looking in an axial direction illustrating the bucket covers passing by the brush seal.
Figure 4:
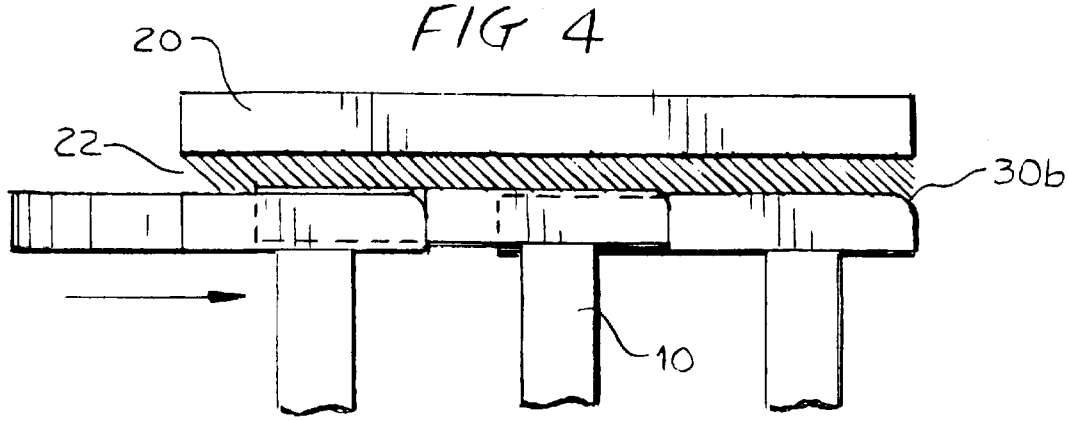
FIG. 4 is a view similar to FIG. 3 illustrating a further embodiment of the present invention.

In accordance with the present invention and as illustrated in FIGS. 2 and 3, the individual bucket covers 12 have leading and trailing edges 30 and 32, respectively, in relation to the direction of rotation of the buckets 10. (It will be appreciated that FIGS. 3 and 4 illustrate the brush seal and bucket covers extending linearly for clarity whereas the brush seal and covers are arcuate about the axis of rotation of the buckets). Thus, adjacent bucket covers constitute leading and trailing bucket covers in the direction of rotation of the buckets with the leading edge 30 of the trailing bucket cover lying adjacent the trailing edge 32 of the leading bucket cover. It will also be appreciated that, as illustrated in FIG. 3, the bristles form acute angles with the surfaces of the bucket covers and which acute angles open in the direction of rotation. That is, the bristles are offset from radii of the shroud and extend in the direction of rotation.

As previously described, the rotation of the bucket covers and pressures exerted on the rotary component, as well as the bucket covers, result in a radial misalignment of the covers. Consequently, radially extending steps are typically formed between adjacent covers, resulting in circumferentially extending outer surfaces of the covers being misaligned one with the other in a circumferential direction. That is, the outer surface of one cover may be radially outwardly of an adjacent cover in the direction of rotation of the rotary component. Consequently, a cover may have a radial step between it and the leading or trailing adjacent cover. Upon engagement with the bristles of the brush seal, the steps cause excessive damage and wear to the bristles, leading to high leakage rates and general performance degradation.

To minimize or eliminate those problems and in accordance with the present invention, the leading edge 30 of each cover in the plane of rotation coincident with the engagement of the bristles and the covers, is provided with a profiled surface to facilitate the passage of the covers past the tips of the bristles without performance degradation and substantial wear of the bristles. As illustrated in FIGS. 2 and 3, the leading edge of each of the covers may be in the form of an inclined surface or ramp 30a sloping radially inwardly from its circumferentially extending sealing surface 34 in the direction of rotation toward the trailing edge 32 of an adjacent leading cover. Thus, whether the sealing surface 34 of the trailing cover is radially outwardly or radially inwardly of the sealing surface 34 of the adjacent leading cover or at the same radial extent as illustrated in FIG. 3, the tips of the bristles will pass over the sealing surface of the leading cover onto the leading edge 30 and then onto the sealing surface of the trailing cover. It will be appreciated that the ramp provides the bristle ends with a more progressive and less forceful transition between the outer sealing surfaces of the leading and adjacent trailing covers, particularly when the sealing surface of the leading cover is radially inset from the sealing surface of the adjacent following cover.

Alternatively, rather than linearly extending ramps, the leading edge surfaces of the covers may be curved, i.e., provided with a convex curve. A convex curved leading edge 30b is illustrated in FIG. 4. It likewise affords a more smooth transition for the bristles when the tips thereof engage succeeding sealing surfaces.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a turbine having a plurality of rotatable buckets and a stationary shroud surrounding the rotatable buckets, a seal between said buckets and said stationary shroud, comprising:

a plurality of arcuate covers carried by radially outer ends of said buckets for rotation with said buckets about an axis in a predetermined circumferential direction, said covers having leading and trailing edges in the direction of rotation of the buckets and radially outer circumferentially and axially extending surfaces in radial registration with the stationary shroud; and a brush seal comprising a plurality of bristles projecting from the shroud for engagement with said cover surfaces forming said seal therebetween;

a leading edge portion of the cover surface of each cover in the direction of rotation of said covers being radially inset relative to said cover surface thereof to afford a smooth transition for the bristles from a leading cover to an immediately adjacent trailing cover as said covers are displaced circumferentially past the bristles.

2. A seal according to claim 1 wherein said leading edge portion of said cover surface comprises a rounded edge.

3. A seal according to claim 1 wherein said leading edge portion of said cover surface comprises a ramp.

4. A seal according to claim 1 wherein said leading edge portion of said cover surface comprises an angled surface extending linearly in the direction of a chord line of a circle about and normal to said axis.

5. A seal according to claim 1 wherein said trailing cover surface projects radially outwardly beyond the leading cover surface, creating a step between said adjacent leading and trailing cover surfaces, said leading edge portion of said cover surface of said trailing cover affording a smooth transition for the bristles as the leading and trailing cover surfaces rotate past the bristles.

6. A seal according to claim 1 wherein said leading edge portion of said cover surface is sloped toward said adjacent cover.

\* \* \* \* \*